United States Patent [19]

Robin et al.

[11] 3,758,547

[45] Sept. 11, 1973

[54] PROCESS OF REACTING A BENZOIC ACID WITH AMINO ALCOHOL

[75] Inventors: Michael Robin, Colonia; Sheldon R. Schulte, Highland Park, both of N.J.;

[73] Assignee: Ashland Oil, Inc., Houston, Tex.

[22] Filed: Feb. 2, 1970

[21] Appl. No.: 8,001

[52] U.S. Cl. ........... 260/472, 260/247.2 B, 260/268, 260/293.81, 260/326.3, 260/477
[51] Int. Cl. ....................... C07c 79/46, C07c 93/20
[58] Field of Search ............................ 260/472, 477; 252/179

[56] References Cited
UNITED STATES PATENTS
3,146,246   8/1964   Goodrich .......................... 260/410.9
3,349,114   10/1967   Heusser ............................. 260/477
2,935,525   5/1960   Debus ................................ 260/472

OTHER PUBLICATIONS

Sussman, "Ind. & Engr. Chem." 38, 1228–1230 (1946)

Groggins, "Unit Processes in Organic Synthesis," 1935, pages 495–498.

*Primary Examiner*—Lorraine A. Weinberger
*Assistant Examiner*—R. S. Weissberg
*Attorney*—Walter H. Schneider

[57] ABSTRACT

An improved process for reacting a benzoic acid with an amino alcohol by the use of certain catalysts.

33 Claims, No Drawings

PROCESS OF REACTING A BENZOIC ACID WITH AMINO ALCOHOL

BACKGROUND OF THE INVENTION

Our invention relates to the reaction of benzoic acids with amino alcohols.

Various methods have been proposed for the preparation of esters of tertiary amino alcohols and benzoic acids. One such process is set forth in U.S. Pat. No. 2,935,525 wherein a direct esterification of benzoic acids with tertiary amino alcohols is carried out. This patent specifically sets forth that a catalyst and particularly an acid catalyst such as hydrochloric acid or sulphuric acid should not be used in the process. The acid according to this patent actually reduces the yield and the speed of the reaction.

Prior art process such as the one disclosed in the above mentioned U.S. patent are deficient in that a considerable amount of time is necessary to carry out the reaction.

Our invention more particularly relates to the reaction of benzoic acids with tertiary amino alcohols in the presence of certain catalysts.

We have unexpectedly found that the direct esterification of benzoic acids with tertiary amino alcohols can be greatly improved by the use of a sorbent-acid system or an acid form ion exchange material as a catalyst. We have found that when using these catalysts we obtain products in much less time at corresponding temperatures than is possible by employing the prior art methods. We have also found that the amount and quality of the product is exceptionally good by the use of our catalyst systems.

BRIEF DESCRIPTION OF THE INVENTION

Our invention comprises a direct method of preparing esters by reacting a tertiary amino reactant alcohol and a reactant benzoic acid in the presence of a catalyst selected from the group consisting of sorbent-acid systems and acid form ion exchange materials. Also the process is carried out in the presence of an inert diluent.

We have unexpectedly and surprisingly found that contrary to the teachings in the prior art, the use of our acid catalysts will greatly enchance the reaction between benzoic acids and tertiary amino alcohols rather than retard the reaction.

DESCRIPTION OF PREFERRED EMBODIMENTS

The amino alcohols which are useful in our process are tertiary amino alcohols in general. The alcohols which have been found to be most advantageous are the di-lower alkylamino alkanols such as dimethylamino-ethanol, diethylamino-ethanol, dimethyl-amino-propanol, dibutyl-amino-propanol, and the piperidinoalkanols such as 3-(2'methyl 1' piperidyl) propanol. Various heterocyclic aminoalkanols such as the pyrrolidianoalkanols, the piperizinoalkanols, and the morpholinoalkanols may also be used. The most preferred alcohol is diethyl-amino-ethanol.

The benzoic acids useful in our process include both benzoic acid per se and substituted benzoic acids. Suitable substituted benzoic acids include the halide substituted benzoic acids such as parachlorobenzoic acid, the alkyl substituted benzoic acids such as o-, m-, and p-methylbenzoic acids, and para tert.butylbenzoic acid, and the nitro benzoic acids. The preferred benzoic acids are the nitro benzoic acids. It is understood, of course, that the nitrobenzoic acids include both substituted and unsubstituted nitrobenzoic acids. Examples of some nitrobenzoic acids are o-, m-, and p- nitrobenzoic acids; 3,4 dinitrobenzoic acid and 3,5 dinitrobenzoic acid; halide substituted nitrobenzoic acids such as 2-chloro-4-nitrobenzoic acid and 2-chloro-5-nitrobenzoic acid; and alkyl substituted nitrobenzoic acids such as 3-methyl-2-nitrobenzoic acid and 3-methyl-4-nitrobenzoic acid. The most preferred nitrobenzoic acid is paranitrobenzoic acid.

The catalyst useful in our invention can be either a sorbent-acid system or an acid form ion exchange material.

The sorbent used in the sorbent-acid system can be any solid carrier which is capable of sorbing the particular acid.

It is to be understood that the term "sorbent" is intended to include both adsorbents and absorbents. It is not the desire of the inventors at this time to be bounded by any theories regarding adsorption or absorption phenomena. The preferred sorbents are siliceous materials such as diatomaceous earth, clay, and silica; carbonaceous materials such as coal, charcoal, and carbon black. The most preferred sorbent is clay.

The acids which are useful in the catalyst of our invention can be any inorganic or any organic acid which in the reaction diluent is capable of being sorbed by the solid carriers. Among the inorganic acids which are useful are hydrochloric acid, sulphuric acid, sulphurous acid, phosphoric acid, and phosphorous acid. Among the organic acids which are useful are the carboxylic acids such as formic acid and acetic acid, and the aromatic sulphonic acids such as benzene sulphonic acid, benzene disulphonic acid and the toluene sulphonic acids such as para toluenesulphonic acid. The preferred acids in our process are phosphoric acid, sulphuric acid, acetic acid, and para toluenesulphonic acid. The most preferred acid is phosphoric acid.

The preferred sorbent-acid systems are clay-phosphoric acid, clay-sulphuric acid, clay-para toleunesulphonic acid, clay-acetic acid, carbon black-phosphoric acid and diatomaceous earth-phosphoric acid. The most preferred sorbent-acid system is a clay-phosphoric acid system.

The catalyst can contain from about 0.1 parts by weight to about 3 parts by weight of acid per part of sorbent, and preferably can contain from about 0.25 parts by weight to about 0.75 parts by weight of acid per part of sorbent. The most preferred ratio of acid to sorbent in the catalyst is about 0.5 parts by weight to about 1 part by weight.

The ion exchange catalyst useful in our process can be any ion exchange material in the acid form. The preferred acid-form ion exchange materials include the acid-form molecular sieves; acid-form zeolites; sulfonated coals such as sulfonated coal, peat; sulfonated lignite, and sulfonated oxidized coal; phosphonated coal; and acid form ion exchange or cation polymeric materials such as the nuclear sulfonic, the methylene sulfonic, the carboxylic, the phosphonic, the phosphorous, the phosphoric, and the phenolic polymeric materials. Among the ion exchange polymeric materials in the acid form are sulfonated cured copolymers of styrene and divinylbenzene, copolymers of an acrylic acid (e.g., — acrylic or methacrylic acid) and divinylbenzene, the reaction products of phenol, acrolein, and the semi-amide of oxalic acid, polystyrene methylene sulfonic acid, sulfonated phenol-aldehyde condensates, sulfonated phenol-aldehyde condensates, polystyrene-phosphorous acid, polystyrene-phosphoric acid, phosphoric acid phenolic condensates. It should further be understood that the ionic characteristics of the polymeric materials is primarily determined by the polar groups, and is quite independent (except for physical properties) of the non-polar portion of the resin structure.

The most preferred ion-exchange catalyst is sulfonated polystyrene.

A commerically available acid-form molecular sieve of particular importance is Zeolon H in the powder form produced by Norton Company. The chemical composition of Zeolon H is $H_8 \cdot Al_8 \cdot Si_4O \cdot O_{96} \cdot 24H_2O$. Zeolon H has a mordenite crystal structure, and possesses the following properties:

| | |
|---|---|
| Bulk Packing Density (lbs./cu.ft.-Loose Fill) | 35 |
| Bulk Particle Density (dehydrated-gms./cc.) | 1.7* |
| Particle Pore Volume (cc./gm.) | 0.20* |
| Particle Specific Volume (dehydrated-cc./gm.) | 0.59* |
| Particle Size (Microns) | 6–12 Ave. |
| Surface Area ($N_2$Bet-m$^2$/gm.) | 500 |
| Water Adsorption (wt.%-17mm at 25°C) | 15 |
| Effective Pore Diameter (A — Approximate) | 10 |
| Maximum Use Temperature (Air — °C) | 800 |

NOTE
* Calculated Value assuming ideal mordenite crystal struc-ture.

It is, of course, recognized that molecular sieves in the acid-form having erionite, chabazite, or foujasite crystal structure are contemplated as being suitable catalysts in our process.

A commerically available cation exchange polymeric material of particular importance is Dowex 50WX8 produced by Dow Chemical Company. Dowex 50WX8 is produced by nuclear sulfonation of styrene — divinylbenzene beads, is light or near white in color, and has the following properties:

| | |
|---|---|
| Standard Crosslinkage % Divinylbenzene | 8 |
| Ionic. Form as Shipped | H + [20–50 mesh] |
| Physical Form | Spheres |
| Standard Mesh Size [Wet] | 20–50 |
| Shipping Density [lb/ft$^3$] | 50 |
| Moisture Content [%] | 53 |
| Volume Change [%] | +8% |
| Effective PH Range | 0–14 |
| Total Exchange Capacity K gr. as $CoCO_3$/ft.$^3$ | 37.0 |
| Meq./g. Dry Resin | 5.0 |
| Meq./ml. Wet Resin | 1.7 |
| Sphericity (%) | >85 |
| Bed Expansion | 30% Maximum at 4 gpm/ft$^3$ at 25°C |
| Pressure Drop | Approx. 0.5 lb/in$^2$/ft at 5 gpm/ft$^2$ |
| Stability | |
| Thermal | Good up to 150°C |
| Solvent | Very Good |
| Oxidation | Slow solution in hot 15% $HNO_3$ |
| Reduction | Very Good |

The following is a list of some other well known acid-form ion exchange polymeric materials:

| Name | Manufacturer | Type |
|---|---|---|
| Amberlite IR-120 | Rohm & Haas Co | Nuclera sulfonic (styrene base). |
| Dowex 50 (Nalcite HCR) | Dow Chemical Co | Do. |
| Chempro C-20 | Chemical Process Co | Do. |
| Permutit Q | Permutit Co. (USA) | Do. |
| Zeo Karb 225 | Permutit Co. Ltd | Do. |
| Amberlite IRC-50 | Rohm & Haas Co | Carboxylic (acrylic). |
| Zeokarb 226 | Permutit Co. Ltd | Do. |
| Amberlite IR-112 | Rohm & Haas Co | Nuclear sulfonic (styrene base). |
| Chempro C-21 | Chemical Process Co | Do. |
| Chempro C-25 | do | Do. |
| IMAC C-12 | IMACTI (Holland) | Do. |
| Resex P | Jos. Crosfield & Sons Ltd | Do. |
| Lewatit S-100 | Bayer-Farben | Do. |
| Ionac C-240 | Am. Zeolite Corp | Do. |
| Permutit RS | Permutit AG (Germany) | Do. |
| Wofatit KPS-200 | Wolfen-Farben | Do. |
| Montecatini C-100 | Montegatini | Do. |
| Montecatini C-300 | do | Do. |
| Resina Cationica | do | Do. |
| Cation G-300 | do | Do. |
| Amberlite IR-1 | Rohm & Haas Co | Sulphonated phenolic. |
| Amberlite IR-100 | do | Do. |
| Amberlite IR-105 | do | Do. |
| Duolite C-3 | Chemical Process Co | Do. |
| Resex | Jos. Crosfield & Sons Ltd | Do. |
| Dowex 30 | Dow Chemical Co | Do. |
| IMAC C-11 | IMACTI (Holland) | Do. |
| Lewatit KSN | Bayer-Farben | Do. |
| Lewatit PN | do | Do. |
| Lewatit KS | do | Do. |
| Lewatit KS-22 | do | Do. |
| Zeo Karb 215 | Permutit Co. Ltd | Do. |
| Zeo Karb 315 | do | Do. |
| Zeo Rex | Permutit Co. (USA) | Do. |
| Ionac C-200 | Am. Zeolite Corp | Do. |
| Wofatit F | Wolfen-Farben | Do. |
| Wofatit P | do | Do. |
| Wofatit K 51 T | do | Do. |
| Wofatit KS | do | Do. |
| Wofatit K | do | Do. |
| Acuolite C-131 | Luis Kelly & Co. (Argentina) | Do. |
| Nihon Kasei Dai Ion BK | Japan Organo | Do. |
| Dusarit S | IMACTI (Holland) | Carboxylic sulfonic. |
| Dusarit VKG | do | Do. |
| Konvertat | Hoganas Billesholms (Sweden) | Do. |
| Lewatit CNS | Bayer-Farben | Do. |
| Lewatit KSB | do | Do. |
| Lewatit KSV | do | Do. |
| Lewatit CN | do | Do. |
| Permutit S-53 | Permutit AG (Germany) | Do. |
| Amberlite XE-89 | Rohm & Haas Co | Carboxylic. |

| Name | Manufacturer | Type |
|---|---|---|
| Duolite CS-100 | Chemical Process Co. | Do. |
| Lewatit CNO | Bayer-Farben | Do. |
| Lewatit C | do | Do. |
| Wofatit-C | Wolfen-Farben | Do. |
| Wofatit-CN | do | Do. |
| Wofatit-C P-300 | do | Do. |
| Wofatit KSB | do | Do. |
| IMAC C-18 | IMACTI (Holland) | Do. |
| Ionac C-265 | Am. Zeolite Corp | Do. |
| Ionac C-270 | do | Do. |
| Permutit C | Permutit AG (Germany) | Do. |
| Permutit H | Permutit Co. (USA) | Do. |
| Permutit H-70 | do | Do. |
| Permutit 216 | do | Do. |
| Zeo Karb 216 | do | Do. |

NOTE: Some of the above enumerated resins are no longer manufactured, but are still in use and are referred to in the literature.

A further discussion of acid-form ion exchange materials can be found in "Ion Exchange Resins" by Robert Kunin, Second Edition, New York, John Wiley & Sons, Inc., 1958, and in particular on pages 76 to 96.

The inert diluent which may be used in our process can be any liquid which will not react under the conditions of the reaction in such a way as to harm the reaction. The inert diluent can preferably have a boiling point within the range of about 50° to about 200° C.

The particularly preferred diluents are the aromatic hydrocarbons such as xylene and diethyl benzene, ester solvents like methylamyl acetate, ether solvents like di-n-butyl ether, aliphatic hydrocarbon solvents such as dicyclopentadiene and the halogenated aromatic hydrocarbons such as chlorobenzene and dichlorobenzene. The most preferred inert diluent is xylene.

The minimum amount of tertiary amino alcohol used in the reaction is about 0.5 moles per mole of the benzoic acid.

Usually quantities of the alcohol above about 1.5 moles per mole of the benzoic acid are not employed. It is of course understood that much higher amounts can be used with the maximum limited only by economical and operational considerations. The amounts of tertiary amino alcohol used in the reaction preferably can be from about 0.9 moles to about 1.1 moles per mole of the benzoic acid. The most preferred molar ratio of tertiary amino alcohol to the benzoic acid is about 1 to 1.

The catalyst used can be in amounts as low as about 0.001 parts of acid or ion exchange material per part of total reactants. The maximum amount of catalyst is limited merely by economical and partical operational conditions. Usually amounts above about 0.15 parts of acid or ion exchange material per part of total reactants are not required. The preferred amount of catalyst is from about 0.01 parts by weight of acid or ion exchange material to about 0.05 parts by weight of acid or ion exchange material per part by weight of total reactants. Most preferred quantity of catalyst is about 0.02 parts of acid or ion exchange material per part of total reactant by weight.

The minimum amount of diluent used can be about 1 part by weight per part by weight of reactants. The upper limit of the diluent is determined only by practical considerations such as economics and operational conditions. Usually amounts above about 10 parts by weight per part of reactants are not used. It preferably is from about 5 parts by weight to about 10 parts by weight per part by weight of reactants. The most preferred amount of diluent is about 7 parts by weight of diluent per part by weight of reactant.

Our reaction can be carried out by using temperatures from about 100° to 200° C. and preferably from about 120° to about 180° C. The most preferred is between about 130° to 140° C. It is most convenient to carry out the reaction under reflux.

The time required for our process may vary dependent primarily upon the particular reactants, temperature, and catalysts. Perferably the reaction time vary from about 4 hours to about 48 hours. About 7 hours is the reaction tome which is the most commonly used. It is also understood that the time is inversely related to the temperature. For example, when the temperature used is at the lower end of the range, the time required will be at the upper end of the range of the time, and when the temperature used is at the upper end of the temperature range then the time required will be at the lower end of the range.

Atmospheric pressure is the most commonly used pressure for carrying out our invention. Of course, higher or lower pressures can be employed.

The water formed from the reaction is taken off and separted so as to allow the reaction to continue. Failure to remove the water from the reaction would result in substantially reduced yields. The water formed in the reaction can be continuously removed as it is formed. Ordinarily, it is most convenient to remove the water as an azeotrope by forming an azeotrope with the inert diluent which desirably is substantially immiscible with the water.

The amino ester can be recovered by using any of the conventional means of recovering a reactant from the reaction medium. For example, it may be convenient to use the conventional steps of filtering and washing to obtain the ester. It has been found desirable to employ the conventional steps of obtaining amino esters which include isolating the amino ester as the amino ester hydrochloride by saturating the reaction solution, after separation of the catalyst, with hydrogen chloride gas at which point the hydrochloride precipitates. The amino ester hydrochloride can then be recovered by filtration and washing.

The compounds formed in our invention are well known and are very useful as precursors in forming anesthetics by conventional methods. For example, the nitrobenzoic esters in our invention can be converted to valuable anesthetics by reduction to the aminobenzoic esters. For example, such compounds as procaine hydrochloride, butyn hydrochloride, tetracaine hydrochloride, naepaine hydrochloride and monocaine hydrochloride, can be obtained from the products of our invention. Also some of the compounds formed in our current process are useful per se as anesthetics, for example the compound 3(2'-methyl-1'-piperidyl) propyl benzoate or piperocaine hydrochloride is a well known anesthetic.

In order that the invention may be better understood, the following non-limiting examples are given: It is understood that all amounts are in parts by weight unless otherwise specified.

Examples

Example 1

Para nitrobenzoic acid, 42 parts, is slurried with 475 parts of xylene, to which is added in order and with agitation 4 parts of clay commerically available as (Filtrol Grade No. 1), 2 parts 85 percent phosphoric acid, and 31 parts diethyl aminoethanol. The mixture is heated in a refluxer fitted with a water separator for about 7 hours, at which time the reaction is completed as evidenced by distillation of the theoretical amount of water, 4.8 parts. The water formed in the reaction is removed by distillation as it is formed. The resultant slurry is cooled to about 50° C. and treated with activated carbon such as (Nuchar 145) and filtered. The filtrate is cooled to below 15° C. and saturated with anhydrous hydrogen chloride gas. The resulting solid is isolated by filtration, washed with 25 parts of xylene, and vacuum dried. The product diethyl-aminoethyl paranitro benzoate hydrochloride is obtained in 74.4 percent of theoretical yield and has a melting point of 167°–172° C.

The theoretical amount of water in the examples is understood to include the amount of water formed in the esterification and the amount of water contributed by the catalyst.

Example 2

The product of example 1 in the form of hydrochloride (34.0 parts) is dissolved in enough distilled water to make 100 parts of solution. The solution is treated with activated carbon such as (Nuchar 145-N) and filtered. The water solution is placed in a 100 gallon hydrogenator and 1 part of 5 percent palladium or carbon is added as a catalyst. The product is reduced in about 1.5 hours. The solution is run through a filter press and neutralized with sodium hydroxide. The press is washed with distilled water. A yield of 91 percent of the procaine base is obtained.

Example 3

Paranitrobenzoic acid, 42 parts, is slurried with 475 parts of xylene to which is added with agitation 30.5 parts of diethyl aminoethanol. The mixture is heated in a refluxer fitted with a water separator for about 25 hours, at which time the reaction is completed as evidenced by the distillation of the theoretical amount of water, 4.5 parts. The water formed in reaction is removed by distillation as it is formed. The solution is cooled to about 50° C. and treated with an activated carbon such as Nuchar 145 and filtered. The filtrate is cooled below 15° C. and saturated with anhydrous hydrogen chloride gas. The resulting solid is isolated by filtration, washed with 25 parts of xylene and vacuum dried. The product diethylaminoethyl paranitrobenzoate hydrochloride is obtained in 74.7 percent of the theoretical yield and has a melting point of about 162°–168° C.

Example 4

Paranitrobenzoic acid, 42 parts, is slurried with 475 parts of xylene to which is added in order and with agitation 4 parts of a clay commerically available as (Filtrol Grade No. 1), 2 parts 85 percent phosphoric acid and 30.5 parts diethylaminoethanol. The mixture is heated in a refluxer fitted with a water separator for about 7 hours, at which time the reaction is completed as evidenced by distillation by the theoretical amount of water, 4.8 parts. The water formed in the reaction is removed by distillation as it is formed. The solution is cooled to about 50° C. and treated with an activated carbon such as Nuchar 145N and filtered. The filtrate is cooled to below 15° C. and saturated with anhydrous hydrogen-chloride gas. The resulting solid is isolated by filtration, washed with 25 parts of xylene, and vacuum dried. The product, diethylaminoethyl para nitrobenzoate hydrochloride, is obtained in 75.3 percent of the theoretical yield and has a melting point of about 169° to about 170° C.

Example 5

Para nitrobenzoic acid, 42 parts, slurried with 475 parts of xylene to which is added in order and with agitation, 4 parts of sulphonated polystyrene which is a solid at the reaction temperature and is commerically available as Dowex 50WX8 and 30.5 parts diethylaminoethanol. The mixture is heated in the refluxer fitted with a water separator for about 12 hours, at which time the reaction is completed as evidenced by distillation of the theoretical amount of water, 6.7 parts. The water formed in the reaction is removed by distillation as it is formed. The solution is cooled to about 50° C. and treated with an activated carbon such as (Nuchar 145N) and filtered. The filtrate is cooled to below 15° C., saturated with anhydrous hydrogen chloride gas. The resulting solid is isolated by filtration, washed with 25 parts of xylene, and vacuum dried. The product diethylaminoethyl para nitrobenzoate hydrochloride is obtained in 73.8 percent of theoretical yield and has a melting point of about 164°–168° C.

Example 6

Para nitrobenzoic acid, 42 parts, is slurried with 475 parts of xylene to which is added in order and agitated 4 parts of a clay commerically available as (Filtrol Grade No. 1), 2 parts 97 percent sulfuric acid, and 30.5 parts diethylaminoethanol. The mixture is heated in a refluxer fitted with a water separator for about 12 hours, at which time the reaction is completed as evidenced by distillation of the theoretical amount of water, 4.9 parts. The water formed in the reaction is removed by distillation as it is formed. The solution is cooled to about 50° C. and treated with an activated carbon such as Nuchar 145N and filtered. The filtrate is cooled to below 15° C. and saturated with anhydrous hydrogen chloride gas. The resulting solid is isolated by filtration, washed with 25 parts of xylene and vacuum dried. The product diethylaminoethanol paranitrobenzoate hydrochloride is obtained in 73.5 percent of the theoretical yield, and has a melting point of about 163° to 168° C.

Example 7

The process of example 6 is repeated except that the sulphuric acid is replaced with 2 parts of paratoluene sulphonic acid. The product diethylaminoethyl paranitrobenzoate hydrochloride is obtained in 74.3 percent of the theoretical yield and has a melting point of 164° to 168° C.

Example 8

Example 6 is repeated except that the clay is replaced with 2 parts of carbon and the sulphuric acid is replaced with 2 parts of 85 percent phosphoric acid. The product diethylaminoethyl paranitrobenzoate hydrochloride is obtained in 71.6 percent of the theoretical yield and has a melting point of 165° to 168° C.

Example 9

Example 6 is repeated except that the sulphuric acid is replaced with 2 parts of glacial acetic acid. The product diethylaminoethyl paranitrobenzoate hydrochloride is obtained in 71.4 percent of the theoretical yield ans has a melting point of 162° to 166° C.

Example 10

The reaction of Example 6 is repeated except that the clay and sulfuric acid are replaced by 2 parts of Zeolon H. The product diethylaminoethyl para nitrobenzoate hydrochloride is obtained in 72 percent of the theoretical yield and has a melting point of 162° to 166° C.

Example 11

Example 6 is repeated except that the clay is replaced by 4 parts of diatomaceous earth commerically available as Celite and the sulphuric acid is replaced with 2 parts of 85 percent phosphoric acid. The product diethylaminoethyl para nitrobenzoate hydrochloride is obtained in 73.7 percent of the theoretical yield and has a melting point of 165° to 168° C.

The results of examples 3 to 11 are recorded in Table 1 below. It can be readily seen that the use of our catalyst systems greatly improves the reactions.

TABLE I

| Catalyst | Hours Required to Remove Theory $H_2O$ | % of Theory Yield | Melt Point of Product °C |
|---|---|---|---|
| 3 None | 25 | 74.7 | 162–8 |
| 4 Clay—4 parts 85% $H_3PO_4$—2 parts | 7 | 75.3 | 169–72 |
| 5 Sulfonated Polystyrene | 12 | 73.8 | 164–8 |
| 6 Clay - 4 parts 97% $H_2SO_4$—2 parts | 12 | 73.5 | 163–8 |
| 7 Clay — 4 parts PTSA $H_2O$ — 2 parts | 12 | 74.3 | 164–8 |
| 8 Carbon — 2 parts 85% $H_3PO_4$ — 2 parts | 12 | 71.6 | 165–8 |
| 9 Clay – 4 parts Glacial Acetic Acid — 2 parts | 12 | 71.4 | 162–6 |
| 10 (Zeolon H) — 2 parts | 12 | 72.0 | 162–6 |
| 11 85% $H_3PO_4$ — 2 parts Diatomaceous Earth — 4 parts | 12 | 73.7 | 165–8 |

Example 12

Paranitrobenzoic acid, 25 parts, is slurried with 200 parts of toluene to which is added in order and with agitation 2.5 parts of sulfuric acid, and 19 parts of diethylaminoethyl ethanol. The mixture is heated in a refluxer fitted with a water separator for 24 hours at which time the reaction is stopped and less than 0.1 parts of water is distilled. The water formed in the reaction is removed by distillation as it is formed. The solution is cooled to about 50° C., treated with an activated carbon such as Nuchar 145 and filtered. The filtrate is cooled to below 15° C. saturated with anhydrous hydrogen chloride gas. The resulting solid is isolated by filtration, washed with 25 parts of toluene and vacuum dried. The product has a melting point of 94° to 105° C. The I R Spectrum lacks the characteristic absorption peak of an ester.

Example 13

Reaction of example 12 is repeated except that toluene is replaced with 200 parts of benzene. The product has a melting point of 69° to 80° C. The IR Spectrum lacked the characteristic absorption peaks of an ester.

Example 14

Paranitrobenzoic acid 16.7 parts is slurried with 200 parts of benzene to which is added with agitation 11.7 parts diethylaminoethanol. The mixture is heated in a refluxer with a water separator for over 24 hours, at which time the reaction is stopped and less than 0.1 parts of water is distilled. The water formed in the reaction is removed by distillation as it is formed. We were unable to isolate any material from the reaction mixture.

The results from Examples 12 – 13, 3 and 4 are recorded in Table 2 below in order to help demonstrate the unexpected results obtained by employing the esterification methods of our invention as compared to the prior art.

We claim:

1. In the direct method of preparing an ester by reacting a tertiary amino reactant alcohol and a reactant acid selected from the group of benzoic acid, halide substituted benzoic acids, alkyl substituted benzoic acids, and nitro substituted benzoic acids, the improvement which comprises conducting the reaction in the presence of a catalytic amount of combination of sorbent and acid.

2. The method of claim 1 wherein the reactant acid is a nitrobenzoic acid.

3. The method of claim 1 wherein the reactant acid is p-nitrobenzoic acid.

4. The method of claim 1 wherein the combination is selected from the group consisting of siliceous material-acid system, and carbonaceous material-acid system.

5. The method of claim 1 wherein the combination is a clay-phosphoric acid catalyst.

6. The method of claim 1 wherein the tertiary amino alcohol is selected from the group consisting of dimethylaminoethanol, diethylaminoethanol, dimethylaminopropanol, dibutylaminopropanol, and

TABLE II

| | Example | | | | |
|---|---|---|---|---|---|
| | 12 | 13 | 14 | 3 | 4 |
| Catalyst | $H_2SO_4$ | $H_2SO_4$ | None | None | [6] $H_3PO_4$ |
| Reaction temp. (° C.) | 112 | 86–8 | 86–8 | 140–2 | 138–40 |
| Reaction time (hrs.) | 24+ | 24+ | 24+ | 24 | 7 |
| Water of reaction | <0.1 | <0.1 | <0.1 | [1] 4.5 T | [1] 4.8 T |
| Percent of theory yield | | | | 74.7 | 75.3 |
| Melting point of prod | [2] 94–105 | [2] 69–80 | (—[3]) | [4] 162–8 | [5] 169–170 |

[1] T indicates approximately theoretical water of reaction.
[2] I.R. Spectra lacked characteristic absorption peaks of ester.
[3] Unable to isolate any material from reaction mixture.
[4] Process of U.S. Patent No. 2,035,525.
[5] Process of our invention.
[6] Clay.

3-(2'-methyl-1'-piperidyl) propanol.

7. The method of claim 1 wherein the amount of said combination is from about 0.1 percent by weight of acid to about 15 percent of acid based upon the weight of the reactants.

8. The method of claim 1 wherein an inert organic diluent which is substantially immiscible with water is used and the reactant acid and alcohol are heated under reflux conditions.

9. The method of claim 8 wherein the inert organic diluent is selected from the group consisting of xylene, diethylbenzene, di-n-butyl ether, dicyclopentadiene, methylamyl acetate, chlorobenzene and o-dichlorobenzene.

10. The method of claim 1 wherein said combination contains from about 0.1 parts by weight to about 3 parts by weight of acid per part of sorbent.

11. The method of claim 10 wherein said combination is a clay-phosphoric acid system.

12. The method of claim 10 wherein said combination is a clay-para toluenesulfonic acid system.

13. The method of claim 10 wherein said combination is a clay-acetic acid system.

14. The method of claim 10 wherein said combination is a diatomaceous earth-phosphoric acid system.

15. The method of claim 10 wherein said combination is a carbon-black-phosphoric acid system.

16. The method of claim 1 wherein the tertiary amino alcohol is diethylaminoethanol.

17. The method of claim 1 wherein said combination is a siliceous material-acid system.

18. In the direct method of preparing an ester of diethylaminoethanol and p-nitrobenzoic acid in the presence of an inert organic diluent which is substantially immiscible with water by heating under reflux conditions, the improvement being the use of a catalytic amount of a combination of sorbent and acid.

19. The method of claim 18 wherein said combination is selected from the group consisting of siliceous material-acid system, and carbonaceous material-acid system.

20. The method of claim 19 wherein the acid is selected from the group consisting of phosphoric acid, sulfuric acid, acetic acid and paratoluene sulfonic acid.

21. The method of claim 18 wherein the inert organic diluent is selected from the group consisting of xylene, diethylbenzene, di-n-butyl ether, dicyclopentadiene, methylamyl acetate, chlorobenzene and o-dichlorobenzene.

22. The method of claim 18 wherein the inert organic diluent is xylene.

23. The method of claim 18 wherein the amount of said combination is from about 0.1 percent by weight to about 15 percent by weight of acid based upon the weight of the reactants.

24. The method of claim 23 wherein the combination is a sorbent-acid system which contains from about 0.1 parts by weight to about 3 parts by weight of acid per part by weight of sorbent.

25. The method of claim 24 wherein the combination is a clay-phosphoric acid system.

26. The method of claim 18 wherein the combination is a sorbent-acid system which contains about 0.25 to about 0.75 parts by weight of acid per part of sorbent, and wherein the amount of combination is about 0.01 to 0.05 parts by weight of acid per part by weight of the reactants.

27. The method of claim 26 wherein the catalyst is a clay-phosphoric acid system.

28. The method of claim 10 wherein the combination contains about 0.25 to about 0.75 parts by weight of sorbent per part of acid.

29. The method of claim 1 wherein said reactant acid is selected from the group of benzoic acid, p-chlorobenzoic acid, o-methylbenzoic acid, m-methylbenzoic acid, p-methylbenzoic acid, p-tert.butyl benzoic acid, o-nitrobenzoic acid, m-nitrobenzoic acid, p-nitrobenzoic acid, 3,4-dinitrobenzoic acid, 3,5-dinitrobenzoic acid, 2-chloro-4-nitrobenzoic acid, 2-chloro-5-nitrobenzoic acid, 3-methyl-2-nitrobenzoic acid, and 3-methyl-4-nitrobenzoic acid.

30. The method of claim 1 wherein the reaction is carried out at a temperature from about 100° to 200° C.

31. The method of claim 1 wherein the reaction is carried out at a temperature from about 120° to about 180° C.

32. The method of claim 18 wherein the reaction is carried out at a temperature from about 100° to 200° C.

33. The method of claim 18 wherein the reaction is carried out at a temperature from about 120° to about 180° C.

* * * * *